G. I. HOHL.
INTERMITTENT MOTION MECHANISM.
APPLICATION FILED JAN. 11, 1921.

1,393,219.

Patented Oct. 11, 1921.

INVENTOR
George I. Hohl,
BY
Fraentzel & Richards
ATTORNEYS

UNITED STATES PATENT OFFICE.

GEORGE I. HOHL, OF NEWARK, NEW JERSEY.

INTERMITTENT-MOTION MECHANISM.

1,393,219.  Specification of Letters Patent.  Patented Oct. 11, 1921.

Application filed January 11, 1921. Serial No. 436,423.

*To all whom it may concern:*

Be it known that I, GEORGE I. HOHL, a citizen of the United States, residing at Newark, in the county of Essex and State of New Jersey, have invented certain new and useful Improvements in Intermittent-Motion Mechanism; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to an improved mechanical transmission gearing; and the invention has reference, more particularly, to a novel construction of gearing adapted to transmit from a continuously rotating driving gear a varying forward motion, a forward motion with intermittent stop, or an intermittent forward and reverse motion to a driven gear.

The invention has for its principal object to provide a novel construction of transmission gearing comprising a train of gears in constantly engaged or running mesh one with another, combined with means for so interrelating the same that they will transmit from a continuously rotating driver to a driven gear either a varying forward motion, a forward motion with intermittent stop, or an intermittent forward and reverse motion.

With the object of my present invention in view, the same consists, primarily, in the novel construction of transmission gearing hereinafter set forth; and the invention consists, furthermore, in the novel arrangements and combinations of the various parts, as well as in the details of the construction thereof, all of which will be hereinafter more fully described and claimed.

The invention is clearly illustrated in the accompanying drawings, in which:—

Figure 1:
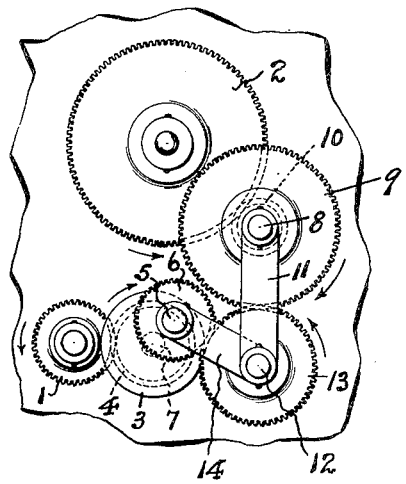
Figure 2:
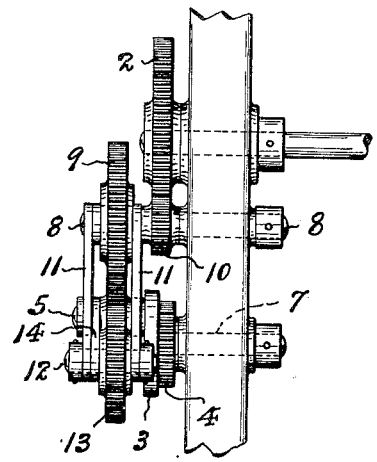
Figure 3:
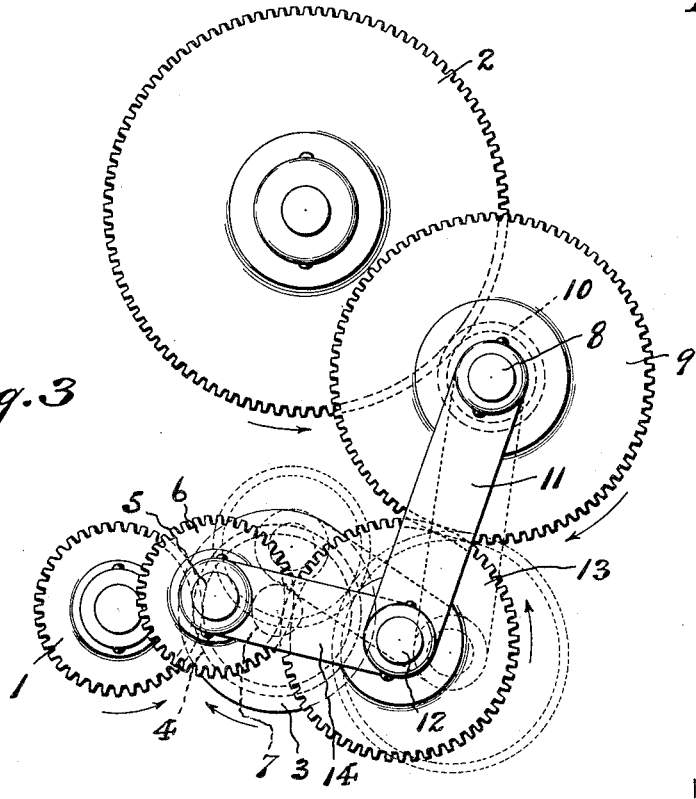

Figure 1 is a face view of the novel construction and arrangement of transmission gearing having its elements interrelated in a manner to transmit from a continuously rotating driver gear to a driven gear a forward motion with intermittent stop; Fig. 2 is an edge or side view of the same, looking toward the left in said Fig. 1; and Fig. 3 is an enlarged face view, the full lines of which illustrate the position of the parts at the beginning of the stop period of the driven gear, and the dotted lines of which illustrate the position of the parts at the end of the stop period of the driven gear and the beginning of renewed forward motion thereof.

Similar characters of reference are employed in all of the above described views, to indicate corresponding parts.

Referring now to said drawings, the reference-character 1 indicates a driver gear and 2 a driven gear between which the novel transmission gearing is operatively disposed.

The novel transmission gearing comprises a rotatable element 3 having at its rear side, or otherwise conveniently related thereto, a concentric gear portion 4 which meshes with said driver gear 1, whereby a continuous rotary movement may be transmitted to said rotatable element 3. It must also be understood that, should it be so desired, said rotatable element 3 may be driven or rotated in any other manner found convenient. Said rotatable element 3 is provided on its forward side or face with an outwardly projecting eccentrically off-set stud 5 upon which is fixed an eccentrically revolving gear 6. Said rotatable element 3, with the eccentrically off-set gear 6 connected therewith, is axially mounted on a journal stud or shaft 7.

Mounted on a journal stud or shaft 8, properly spaced and positioned the required distance from the position of said rotatable element 3, as determined by the journal stud or shaft 7 of the latter, is a rotatable transmission gear 9, which may mesh directly with a gear to be driven, or, as shown in the drawings, may be connected to drive said driven gear 2 through an intermediate reduction or other gear 10, which is mounted on and rotated by said journal stud or shaft 8 upon which said transmission gear 9 is mounted.

Pivoted upon said journal stud or shaft 8 is a swinging frame, preferably comprising a pair of depending links 11, one on each side of said transmission gear 9, the lower or free ends of which support a transverse axle stud 12 upon which is mounted an idler gear 13 arranged to mesh with said transmission gear 9.

Said idler gear 13 also meshes with said eccentrically revolving gear 6, being maintained in meshed relation thereto by a retaining link 14 which interconnects said axle stud 12 with said eccentrically off-set stud 5 of said rotatable element 3.

In the example of my invention illustrated in the accompanying drawings, the relation of the pitch diameters of the gears of the transmission set one to the other, the degree of off-set of the eccentric gear 6 and the distance between the axis of said rotatable element 3 and the axis of said transmission gear 9, are all so arranged that, in operation, a forward motion with intermittent stop will be imparted to the driven gear 2. In operation, the gears turn in the directions indicated by the arrows in Figs. 1 and 3. As the eccentrically off-set gear 6 is revolved by the rotation of the rotatable element 3, it drives the idler gear 13, which in turn drives the transmission gear 9. The retaining link 14, by compelling an oscillation or swinging movement of the links 11, assures that the idler gear 13 will follow the movement of said eccentric gear 6 at all points of its revolution so as to remain constantly in mesh therewith, and subject to a continual rotary impulsion therefrom. As the rotatable element 3 carries the eccentric gear 6 outwardly, the swinging links 11 follow the movement under the pull of said retaining link 14, and since this outward swinging movement of the links 11 and the idler gear 13 is in the same direction as the direction of rotation imparted to the transmission gear 9, the latter continues to be forwardly rotated until the limit of outward movement of said eccentric gear 6, and consequently the limit of outward movement of said links 11, is reached, at which time the off-set stud 5, the journal stud or shaft 7 and the axle stud 12 will be in alinement (as shown by the full lines in Fig. 3), and up to this point the rotation imparted to the idler gear 13 will continue to transmit a forward motion to said transmission gear 9. As the rotatable element 3 continues its movement, and begins to carry the eccentric gear 6 inwardly, the swinging movement of the links 11 is reversed, while the idler gear 13 continues to rotate. This reverse swinging movement of the links moves the idler gear bodily in a direction the reverse to that of its rotation, and consequently, the rotation of idler gear during such reverse bodily movement results merely in a rolling action of the same upon the transmission gear 9, with the effect of stopping the transmission of rotary movement to said transmission gear 9, and consequently producing a stop of said driven gear 2. This stop continues for the period required for the rotatable element 3 to turn through approximately 90 degrees (as indicated by the dotted representation of such position shown in Fig. 3 of the drawings). During this period of movement, the speed of rotation of the idler gear 13 is substantially equivalent to the speed of reverse bodily movement of the same, but after this period is passed the reverse bodily movement slows rapidly relative to the speed of rotation until the outward bodily movement again occurs, so that the idler gear 13 begins to transmit movement to said transmission gear 9, which movement of the latter is continued during the entire period of outward bodily movement of said idler gear, thus completing the cycle of forward motion with period of stop. In the example of my invention illustrated in the drawings, and designed to produce the above described results, the pitch diameters of the eccentric gear 6, transmission gear 9, and idler gear 13, are such that the eccentric gear 6 and transmission gear 9 bear a given ratio one to the other, while the idler gear must have the same number of teeth as the eccentric gear plus a sufficient number of additional teeth to accord with its period of "roll back" upon the transmission gear 9. As shown in the drawings the eccentric gear 6 and transmission gear 9 bear a one to two relation or ratio, the former having forty teeth and the latter eighty teeth, while the idler gear 13 has fifty-eight teeth, therefore equaling the forty teeth of said eccentric gear 6 plus eighteen additional teeth to compensate its rotary transmission movement to the period of "roll back" on the transmission gear 9.

It must be understood, however, that by reducing or increasing the pitch diameter relation of the idler gear 13 to that of the eccentric gear 6, or by varying the off-set of the eccentric gear, or by changing the spaced relation of the axis of the rotatable element 3 relative to that of the transmission gear 9, variations of transmitted motion may be secured, to wit, the transmission gear may be continuously driven forward with intermittent variations of speed, may be driven forward with intermittent stops of longer or shorter duration, or may be driven with an alternated intermittent forward and reverse rotation.

My novel arrangement and construction of transmission mechanism not only offers many advantages by reason of its variability, permitting the same to be readily adapted to a great variety of uses, but offers a transmission mechanism of great durability, strength and efficiency by reason of the fact that its gears are constantly running in mesh, so that the device is practically noiseless, and is not subject to the clashing or undue strains or stresses which occur with devices in which parts must be periodically moved into and out of engagement.

I am aware that some changes may be made in the general arrangements and combinations of the various devices and parts of my present invention, as well as in the details of the construction thereof, without departing from the scope of said invention as set forth in the foregoing specification and as defined in the appended claims.

Hence, I do not limit my invention to the exact arrangements and combinations of the various devices and parts as described in said specification, nor do I confine myself to the exact details of the construction of the said parts as illustrated in the accompanying drawings.

I claim:—

1. An intermittent motion mechanism comprising an eccentrically revolved gear, transmission gear, a swinging frame pivoted to oscillate from the axis of said transmission gear, an idler gear rotatably mounted on said swinging frame to mesh with said transmission gear, and means compelling said frame to oscillate synchronously with the movement of said eccentrically revolved gear whereby the latter is retained in operative driving meshed relation to said idler gear.

2. An intermittent motion mechanism comprising an eccentrically revolved gear, a transmission gear, a swinging frame pivoted to oscillate from the axis of said transmission gear, an idler gear rotatably mounted on said swinging frame to mesh with said transmission gear, said idler gear being driven by said eccentrically revolved gear, and a link pivoted by one end to said frame and having its opposite end centrally pivoted relative to said eccentrically revolved gear whereby the latter is retained in mesh with said idler gear.

3. An intermittent motion mechanism comprising a rotatable element having an eccentrically off-set gear connected therewith, a transmission gear, a swinging frame pivoted to oscillate from the axis of said transmission gear, an idler gear rotatably mounted on said swinging frame to mesh with said transmission gear, said idler gear being driven by said eccentrically off-set gear, and a link pivoted by one end to said frame and having its opposite end centrally pivoted relative to said off-set gear whereby the latter is retained in mesh with said idler gear.

4. An intermittent motion mechanism comprising a rotatable element having an eccentrically off-set gear connected therewith, a transmission gear, a swinging frame pivoted to oscillate from the axis of said transmission gear, an idler gear rotatably mounted on said frame in constant mesh with said transmission gear, said idler gear running also in constant mesh with said eccentrically off-set gear so as to be driven thereby, and means compelling said frame to oscillate synchronously with the movement of said eccentrically off-set gear.

5. An intermittent motion mechanism comprising a rotatable element, means for driving said rotatable element, a gear fixed to said rotatable element in eccentrically off-set relation thereto, a transmission gear, a swinging frame pivoted to oscillate from the axis of said transmission gear, an idler gear in mesh with said transmission gear, means on said swinging frame for rotatably mounting said idler gear thereon, said idler gear being driven by said eccentrically off-set gear, and means for maintaining said idler gear and said eccentrically off-set gear in constant mesh.

6. An intermittent motion mechanism comprising a rotatable element having a stud eccentrically off-set relative to its axis, an off-set gear fixed on the stud of said rotatable element, a transmission gear, a swinging frame pivoted to oscillate from the axis of said transmission gear, an axle stud carried by said swinging frame, an idler gear rotatably mounted on said axle stud to mesh with said transmission gear, said idler gear being driven by said off-set gear, and a retaining link interconnecting the off-set stud of said rotatable element with the axle stud of said swinging frame.

7. An intermittent motion mechanism comprising a rotatable element, means for driving said rotatable element, a stud eccentrically off-set from the axis of said rotatable element to project from the face thereof, an off-set gear fixed on said stud, a transmission gear, means for rotatably mounting said transmission gear in spaced relation from said rotatable element, a swinging frame pivoted to oscillate from the axis of said transmission gear, an idler gear rotatably mounted on said swinging frame to mesh with said transmission gear, said idler gear being driven by said off-set gear, and a retaining link pivoted by one end to said swinging frame and having its opposite end pivoted upon said off-set stud of said rotatable element whereby the latter is retained in mesh with said idler gear.

8. An intermittent motion mechanism comprising a rotatable element, means for driving said rotatable element, a stud eccentrically off-set from the axis of said rotatable element to project from the face thereof, an off-set gear fixed on said stud, a transmission gear, a shaft for mounting said transmission gear, a swing frame pivoted to said shaft, an axle stud carried by said frame, an idler gear rotatably mounted on said axle stud to mesh with said transmission gear, said idler gear being driven by said off-set gear, and a retaining link interconnected between said axle stud and said off-set stud of said rotatable element.

9. An intermittent motion mechanism comprising a rotatable element having an eccentrically off-set gear fixed thereto, a transmission gear having a pitch diameter in predetermined ratio to that of said off-set gear, a swinging frame pivoted to oscillate from the axis of said transmission gear, an idler gear mounted on said swinging frame to mesh with said transmission gear, said idler gear being driven by said off-set gear, said idler gear having a pitch diameter providing a relatively increased number of teeth as compared with the number of teeth of said off-set gear to permit of a "roll back" motion of said idler gear while still driving said transmission gear forward in accord with the ratio between the latter and said off-set gear, and means compelling said swinging frame to oscillate synchronously with the movement of said off-set gear.

10. An intermittent motion mechanism comprising a rotatable element having an eccentrically off-set gear fixed thereto, a transmission gear having a pitch diameter in predetermined ratio to that of said off-set gear, a swinging frame pivoted to oscillate from the axis of said transmission gear, an idler gear mounted on said swinging frame to mesh with said transmission gear, said idler gear being driven by said off-set gear, said idler gear having a pitch diameter providing a relatively increased number of teeth as compared with the number of teeth of said off-set gear to permit of a "roll back" motion of said idler gear while still driving said transmission gear forward in accord with the ratio between the latter and said off-set gear, and a link pivoted by one end to said swinging frame and having its opposite end centrally pivoted relative to said off-set gear whereby the latter is retained in mesh with said idler gear.

In testimony, that I claim the invention set forth above I have hereunto set my hand this 4th day of January, 1921.

GEORGE I. HOHL.

Witnesses:
GEORGE D. RICHARDS,
L. McGREGOR DEMAREST.